US012565008B2

(12) United States Patent　(10) Patent No.:　US 12,565,008 B2
Prakash et al.　(45) Date of Patent:　Mar. 3, 2026

(54) SYSTEM AND METHOD FOR CONTROLLING RATE OF FLOW OF PRINTING MATERIAL

(71) Applicant: Brinter Oy, Turku (FI)

(72) Inventors: Dhayakumar Rajan Prakash, Turku (FI); Tomi Kalpio, Turku (FI)

(73) Assignee: Brinter AM Technologies Oy, Turku (FI)

( * ) Notice: Subject to any disclaimer, the term of this patent is extended or adjusted under 35 U.S.C. 154(b) by 0 days.

(21) Appl. No.: 18/066,114

(22) Filed: Dec. 14, 2022

(65) Prior Publication Data

US 2024/0198597 A1　Jun. 20, 2024

(51) Int. Cl.
*B29C 64/393*　(2017.01)
*B29C 64/118*　(2017.01)
*B29C 64/209*　(2017.01)
*B33Y 10/00*　(2015.01)
*B33Y 30/00*　(2015.01)
*B33Y 50/02*　(2015.01)

(52) U.S. Cl.
CPC .......... *B29C 64/393* (2017.08); *B29C 64/118* (2017.08); *B29C 64/209* (2017.08); *B33Y 10/00* (2014.12); *B33Y 30/00* (2014.12); *B33Y 50/02* (2014.12)

(58) Field of Classification Search
CPC ... B29C 64/118; B29C 64/209; B29C 64/393; B29C 64/106; B29C 64/343; B33Y 10/00; B33Y 30/00; B33Y 50/02; B33Y 40/00; B05C 11/101; B22F 10/85; B22F 12/53; B22F 12/57; B22F 12/90; B41J 2/17503
See application file for complete search history.

(56) References Cited

U.S. PATENT DOCUMENTS 4,109,831 A * 8/1978 Culpepper ......... F01M 11/0458
222/254
5,060,826 A * 10/1991 Coleman .............. B67D 1/0462
222/105

(Continued)

FOREIGN PATENT DOCUMENTS

JP　2015-80473 A　4/2015
JP　2015080473 A * 4/2015

OTHER PUBLICATIONS

International Search Report and Written Opinion of the International Searching Authority issued in International Patent Application No. PCT/FI2023/050664 dated Mar. 28, 2024.

*Primary Examiner* — Bob Zadeh
(74) *Attorney, Agent, or Firm* — BakerHostetler

(57) ABSTRACT

A system for controlling rate of flow of printing material in dispensing system. The system includes a pressure source configured to provide pressure for dispensing of printing material; cartridge configured to hold printing material with a plunger for displacing printing material; cartridge adapter coupled to first end of cartridge; distance sensor operable to measure distance (D) between cartridge adapter and plunger; cartridge outlet configured to dispense printing material; and processor operatively coupled to pressure source and distance sensor, wherein processor is configured to utilize predefined set of parameters related to cartridge and control pressure source to regulate pressure to control rate of flow of printing material.

9 Claims, 8 Drawing Sheets

(56) References Cited

U.S. PATENT DOCUMENTS

| | | | | |
|---|---|---|---|---|
| 5,103,728 A * | 4/1992 | Barney | ................ | B41F 31/022 |
| | | | | 101/364 |
| 6,067,906 A * | 5/2000 | Ryan | .................... | B41F 31/022 |
| | | | | 222/386 |
| 2015/0314613 A1 | 11/2015 | Murphy et al. | | |
| 2017/0165792 A1 * | 6/2017 | Buller | .................. | B29C 64/214 |
| 2017/0369827 A1 * | 12/2017 | Langenfeld | ........... | A61L 27/222 |
| 2019/0275585 A1 * | 9/2019 | Akram | ...................... | B22F 1/10 |
| 2020/0139623 A1 * | 5/2020 | Kalpio | ................... | B22F 10/00 |
| 2021/0298343 A1 | 9/2021 | Snover et al. | | |
| 2022/0212408 A1 * | 7/2022 | Liu | ....................... | B29C 64/209 |
| 2024/0198597 A1 * | 6/2024 | Prakash | ............... | B29C 64/393 |

* cited by examiner

200

300

500A

500B

500C

516

518

514

500D

522

524

520

600A

604

602

600B

608

606

FEED PREDEFINED SET OF PARAMETERS IN PROCESSOR
802

MEASURE DISTANCE BETWEEN CARTRIDGE ADAPTER AND
PLUNGER USING DISTANCE SENSOR
804

USE PROCESSOR OPERATIVELY COUPLED TO PRESSURE SOURCE,
AND DISTANCE SENSOR
806

SYSTEM AND METHOD FOR CONTROLLING RATE OF FLOW OF PRINTING MATERIAL

TECHNICAL FIELD

The present disclosure relates to systems for controlling a rate of flow of a printing material in a dispensing system. The present disclosure also relates to methods for controlling a rate of flow of a printing material in a dispensing system. The present disclosure also relates to computer-program products for printing material in a dispensing system.

BACKGROUND

With the advancement in technology, the manufacturing processes have been evolving day by day. Nowadays, the manufacturing processes such as multidimensional printing, bio printing, pharma printing, subtractive manufacturing, casting process, and the like, have been used for the manufacturing of various products. In this regard, each of the aforementioned manufacturing processes require a particular device to perform a unique function.

Generally, a multidimensional printing device is used for the multidimensional printing of medicines, biomedical constructs and engineering, biotechnology (human tissue replacement), and so forth. However, such multidimensional printing devices fail to accurately customize a plurality of parameters that are required for (and during) the multidimensional printing.

Typically, a pressure-based pump device is used for extrusion of material. Such pressure-based pump device comprises a cartridge assembly having a plunger for extrusion of the material. However, such cartridge assembly is non-transparent and thus restricts a user to visualize a movement or a position of the plunger in the cartridge assembly. Conventionally, a syringe pump device is used for the extrusion of the material. The syringe pump device employs a stepper motor to control the plunger in the cartridge assembly. However, in such syringe pump devices, a flow rate is dependent on the stepper motor's linear displacement rate and therefore could not be used to manipulate multiple materials.

Conventionally, there exists some devices that include external flow meters or different other sensors during the extrusion of the materials. However, such devices fail to measure the exact flow rate of the material in the cartridge assembly which doesn't have transparency. Moreover, such devices cause waste of the material, thereby making such devices cost-inefficient. Furthermore, such devices lack precision or quality control over the material extrusion Therefore, in light of the foregoing discussion, there exists a need to overcome the aforementioned drawbacks associated with the existing manufacturing devices that are used for the extrusion of the materials.

SUMMARY

The present disclosure seeks to provide a system for controlling rate of flow of a printing material in a dispensing system. The present disclosure also seeks to provide a method for controlling a rate of flow of a printing material in a dispensing system. The present disclosure also seeks to provide a computer-program product for printing material in a dispensing system. An aim of the present disclosure is to provide a solution that overcomes at least partially the problems encountered in prior art.

In a first aspect, an embodiment of the present disclosure provides a system for controlling rate of flow of a printing material in a dispensing system, the system comprising:

a pressure source configured to provide pressure for dispensing of the printing material;

a cartridge having a first end and a second end, the cartridge operatively coupled to the pressure source and configured to hold the printing material therein, wherein the cartridge comprises a plunger for displacing the printing material from the cartridge;

a cartridge adapter coupled to the first end of the cartridge;

a distance sensor operable to measure a distance (D) between the cartridge adapter and the plunger;

a cartridge outlet having variety of connections arranged on the second end of the cartridge and configured to dispense the printing material; and a processor operatively coupled to the pressure source, the fluid valve and the distance sensor, wherein the processor is configured to utilize a predefined set of parameters related to the cartridge to calculate a required distance (D') between the cartridge adapter and the plunger corresponding to a volume of the printing material required to be dispensed; and control the pressure source to regulate a pressure to move the plunger to be at the required distance (D') from the cartridge adapter at a defined speed to control the rate of flow of the printing material.

In a second aspect, an embodiment of the present disclosure provides a method for controlling a rate of flow of a printing material in a dispensing system, the method comprising:

feeding a predefined set of parameters in a processor;

measuring a distance (D) between a cartridge adapter and a plunger using a distance sensor, wherein the distance sensor is arranged on the cartridge adapter that is sealingly coupled to a first end of a cartridge; and using the processor operatively coupled to a pressure source, and the distance sensor, wherein the processor is configured to utilize the measured distance (D) and/or the predefined set of parameters to calculate a required distance (D') between the cartridge adapter and the plunger corresponding to the volume of the printing material required to be dispensed; and control the pressure source to regulate amount of pressure to move the plunger to be at the required distance from the cartridge adapter at a defined speed, to control the rate of flow of the printing material.

In a third aspect, an embodiment of the present disclosure provides a computer-program product for printing material in a dispensing system, wherein the material to be printed is a biomaterial, a biological material, a pharmacological material or a combination of the aforementioned, the computer program product comprising a non-transitory machine-readable data storage medium having stored thereon program instructions that, when accessed by a processor, cause the processor to execute steps of a method of any of the aforementioned claims.

Embodiments of the present disclosure substantially eliminate or at least partially address the aforementioned problems in the prior art and enable an efficient system and an improved method for controlling a rate of flow of a printing material in a dispensing system. Beneficially, the system and method enable accurate control over the rate of flow of the printing material by using a feedback loop. Advantageously, the system is robust and does not require external sensors or devices to control printing parameters thereof. Moreover, the system is cost-effective and prevents the wastage of the printing material during the extrusion process.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
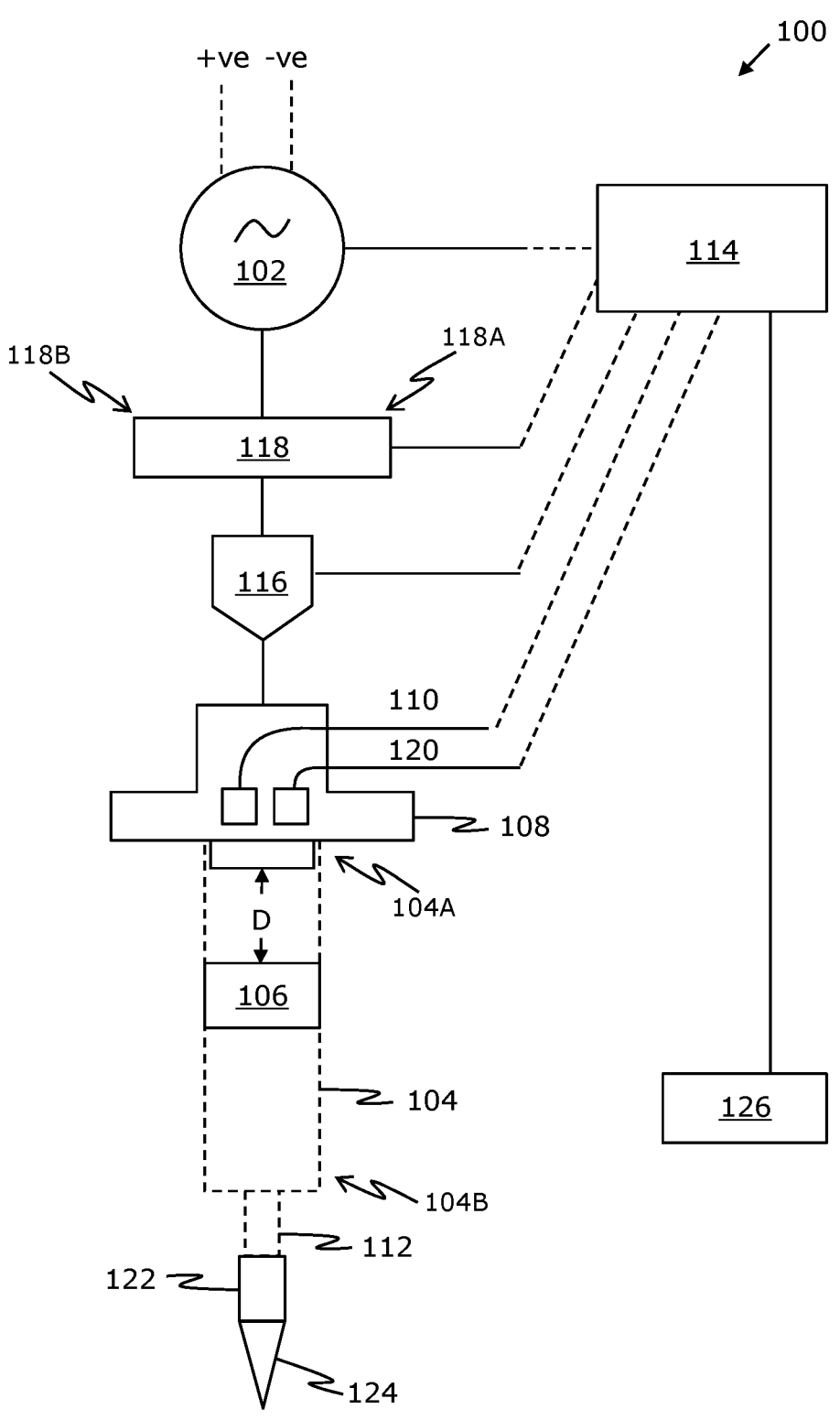
FIG. 1 is a schematic illustration of a system for controlling a rate of flow of a printing material, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system for controlling rate of flow of a printing material in a dispensing system, the system comprising:
- a pressure source configured to provide pressure for dispensing of the printing material;
- a cartridge having a first end and a second end, the cartridge operatively coupled to the pressure source and configured to hold the printing material therein, wherein the cartridge comprises a plunger for displacing the printing material from the cartridge;
- a cartridge adapter coupled to the first end of the cartridge;
- a distance sensor operable to measure a distance (D) between the cartridge adapter and the plunger;
- a cartridge outlet having variety of connections arranged on the second end of the cartridge and configured to dispense the printing material; and
- a processor operatively coupled to the pressure source, and the distance sensor, wherein the processor is configured to
  - utilize the measured distance (D) and/or a predefined set of parameters related to the cartridge to calculate a required distance (D') between the cartridge adapter and the plunger corresponding to a volume of the printing material required to be dispensed; and
  - control the pressure source to regulate a pressure to move the plunger to be at the required distance (D') from the cartridge adapter at a defined speed to control the rate of flow of the printing material.

In a second aspect, an embodiment of the present disclosure provides a method for controlling a rate of flow of a printing material in a dispensing system, the method comprising:
- feeding a predefined set of parameters in a processor;
- measuring a distance (D) between a cartridge adapter and a plunger using a distance sensor, wherein the distance sensor is arranged on the cartridge adapter that is sealingly coupled to a first end of a cartridge; and
- using the processor operatively coupled to a pressure source and the distance sensor, wherein the processor is configured to
  - utilize the measured distance (D), and/or the predefined set of parameters to calculate a required distance (D') between the cartridge adapter and the plunger corresponding to the volume of the printing material required to be dispensed; and
  - control the pressure source to regulate amount of pressure to move the plunger to be at the required distance from the cartridge adapter at a defined speed, to control the rate of flow of the printing material.

In a third aspect, an embodiment of the present disclosure provides a computer-program product for printing material in a dispensing system, wherein the material to be printed is a biomaterial, a biological material, a pharmacological material or a combination of the aforementioned, the computer program product comprising a non-transitory machine-readable data storage medium having stored thereon program instructions that, when accessed by a processor, cause the processor to execute steps of a method of any of the aforementioned claims.

The present disclosure provides the aforementioned system, the aforementioned method and the aforementioned computer program product for controlling a rate of flow of a printing material in a dispensing system. The system enables accurate and efficient control of the rate of flow of the printing material during extrusion or infusion thereof. Beneficially, the system prevents wastage of the printing material, when in operation. Moreover, the system employs a distance sensor that is used to quantify a position of a plunger present in a cartridge and then to determine a volume, a flowrate of the printing material and an internal pressure in the cartridge in real-time. It will be appreciated that a combination of the distance sensor and a pressure sensor makes it possible to keep the speed of the plunger constant where a unidirectional flow of the printing material is required.

The term "rate of flow" as used herein refers to a volume of fluid that passes per unit of time. The SI unit of rate of flow is cubic meters per second (m³/s). Typically, the rate of flow is measured using a flowmeter such as an ultrasonic flow meter, a positive displacement flow meter, a differential pressure flow meter, and so forth. It will be appreciated that the rate of flow is controlled for various reasons based on an application thereof. For example, the rate of flow is measured to prevent wastage of fluid that occur due to leakage thereof, thereby preventing a revenue loss and making the system cost-efficient.

The term "printing material" as used herein refers to a material for manufacturing an object. The printing material may be in a powdered form, in a liquid form, in a form of a continuous filament, and so forth. Moreover, the printing material has pre-defined characteristics. The characteristics include, but do not limit to, a mass, a weight, a volume, a density, flow characteristics and rheological properties. In an example, the rheological properties of a hydrogel depend on a mechanism, degree of crosslinking and structure of the molecules, and the rheological properties are tuned by changing the structure, molecular weight, concentration of a gelator or by adding other molecules into the hydrogel. The gelator is a substance that is capable of forming a gel. Optionally, the material used for printing is a biomaterial, a biological material, a pharmacological material, or a combination of the aforementioned. The term "biomaterial" as used herein refers to a material that possesses the ability to interact with a biological arrangement (such as a circulatory system, a respiratory system) for a medical purpose. The medical purpose may either be a therapeutic purpose such as to treat, augment, repair, or replace a tissue function of a human body or a diagnostic purpose. Optionally, the biomaterial is selected based on an application thereof. The term "biological material" as used herein refers to a material containing genetic information and capable of reproducing itself or being reproduced in a biological arrangement. In other words, the biological materials are materials that are produced by living organisms. For example, the biological material includes blood, bone, proteins, muscle, and other organic materials. The term "pharmacological material" as used herein refers to a substance that is used in a manufacturing of a drug in order to generate a desired effect of the drug. For example, the pharmacological material is an active pharmaceutical ingredient (API) that is used to produce the desired effect on the human body to treat a condition.

Moreover, the printing material may be a combination of the biomaterial and the biological material. In this regard, the combination may be a bio-ink that is the biomaterial laden with biological materials such as living cells. Optionally, the printing material may be a metal (such as titanium, steel, aluminium, copper, an alloy, superalloys, and so forth), a composite base, continuous fibre filaments, and so forth. Furthermore, the printing material may be a combination of the biomaterial and the pharmacological material. For example, such combination is a compounded drug or a medication that is produced by combining, mixing, or altering ingredients in a certain volumetric ratio based on the requirement of an individual patient. In another example, the combination includes a mixture of two different bio-inks having different volume ratios to provide a predefined mix ratio of a final bio-ink. Optionally, such combinations of the printing material are used to produce bioactive glass. Optionally, such combinations of the printing material include compositions that could be altered to incorporate different ions in the structure of the bioactive glass to achieve tailored degradation and bioactivity thereof.

Optionally, the dispensing system is a 3D printer. The 3D printer refers to a printing device that creates a three-dimensional object by forming one or multiple layers, layer by layer format or volumetrically or in a non-planar form thereof at a time, based on the three-dimensional digital model of the object. Moreover, the multidimensional digital model is typically a software file that comprises details corresponding to the desired printed object. Such details of the printed object include, but do not limit to, a shape, a weight, a density, a fabrication material, a composition, ratio of individual components. It may be appreciated that a variety of three-dimensional printers exist and are known to a person skilled in the art, and thus have not been described in detail herein for the brevity of the present disclosure. Optionally, the dispensing system is a cartridge-based arrangement that supports multiple printing materials to be mixed in a pre-defined manner to obtain a final product of desired composition, porosity, functionality (4D materials) or color. The materials may be liquid or high viscous pastes, granulates, powder which when exposed in right environment changes to printable format where the tool head can dispense the material out. Optionally, the dispensing system employs an endless piston technique during which a speed of the shaft is used to manipulate the dispensation of the printing material.

The term "pressure source" as used herein refers to a device that, in operation, generates a pressure in the system. The pressure generated by the pressure source is exerted upon other components of the system to precisely dispense the printing material therefrom. Optionally, the pressure could be generated using at least one of: gas, liquid. Examples of gas include, but are not limited to, argon gas, helium gas, nitrogen gas, xenon gas. The pressure could lie in a range of 0.1 millibars (mbar) to 100000 millibars. Optionally, the pressure source could be at least one of: a displacement pump, a dynamic pump, a piezo pump, and so forth. Examples of the displacement pump include, but are not limited to, reciprocating pump, and rotating pump. Examples of the dynamic pump include, but are not limited to, centrifugal pump, and special effect pump.

The pressure source is configured to provide the pressure for dispensing of the printing material. In this regard, the dispensing includes an extruding of the printing material or an infusing of the printing material from/to the system. The pressure generated by the pressure source could be at least one of: a positive pressure, a negative pressure. The term "positive pressure" refers to the pressure generated by the pressure source to facilitate a downward flow of the printing material filled in the system. The positive pressure leads to the extrusion of the printing material. Optionally, the pressure source such as a compressor is used to generate the positive pressure. The term "negative pressure" refers to the pressure generated by the pressure source to facilitate the infusion of the printing material into the system. The negative pressure is obtained by creating a vacuum in the system. Optionally, the pressure source such as a vacuum pump is used to generate the negative pressure. The terms "positive" and "negative" used hereinabove indicate a direction of pressure, wherein "positive" pressure means that the pressure is exerted outwards from the pressure source whereas "negative" pressure means that the pressure is exerted inwards into the pressure source. Advantageously, the technical effect of using the different types of the pressure source is that the system can accurately extrude or infuse the printing material using dedicated pressure sources.

Optionally, the system further comprises a fluid valve coupled to the pressure source, the cartridge and the processor, wherein the fluid valve is configured for allowing fluid flow in direction from/to the pressure source as per the configuration.

The term "fluid valve" as used herein refers to a device that regulates, directs or controls a flow of a fluid (such as gas, liquid) by opening, closing, or partially obstructing various passageways. For example, in an open valve, fluid flows in a direction from a higher pressure to a lower pressure. Optionally, the fluid valve is a one way valve that allows the fluid to pass therethrough in only one direction. Typically, the fluid valve is a two-port valve having two openings, one for the fluid to enter and the other for the fluid to leave. Optionally, the fluid valve is compact and possesses a simple design. Optionally, the fluid valve is available in a wide range of sizes. In this regard, the fluid valve is operatively coupled to the pressure source to allow the fluid to flow at the positive pressure or the negative pressure. In operation, when the system is required to extrude the printing material then the pressure source is operable to generate the positive pressure and the fluid valve is operable to allow the fluid to flow in direction from the pressure source. Optionally, the fluid valve is a solenoid valve. Optionally, the fluid valve is integrated into the cartridge adapter of the system.

The term "cartridge" as used herein refers to a casing that is capable of holding a material inside it. Moreover, the cartridge comprises a body having the first end and the second end. Notably, the cartridge is operatively coupled to the fluid valve from the first end thereof. Optionally, the cartridge could be of various sizes and shapes. For example, the cartridge could have a cuboidal shape, a spherical shape, a cylindrical, an elliptical shape, and so forth. Optionally, the cartridge is fabricated using a material that could be selected from at least one of: a plastic, a composite, a glass, a polymer, a metal. Optionally, the plastic material could be a polytetrafluoroethylene (PTFE), an acrylonitrile butadiene styrene (ABS), and the like. The PTFE is a synthetic fluoropolymer of tetrafluoroethylene. The acrylonitrile butadiene styrene (ABS) is an opaque thermoplastic and an amorphous polymer comprised of three monomers such as the acrylonitrile, the butadiene and the styrene. Optionally, the metal could be a sliver metal, an aluminium metal, and the like. More optionally, the cartridge has a required volume based on an application thereof. For example, the required volume could lie in a range of 1 femtolitre to 1 decilitre. The cartridge is configured to hold the printing material therein. Optionally, the cartridge could be made of a non-reactive material that does not interfere with the chemical or physical properties of the printing materials stored therein. Optionally, the cartridge is implemented as a syringe barrel. Optionally, the cartridge includes a plurality of openings for infusing or extruding the printing material therefrom.

The cartridge comprises a plunger for displacing the printing material from the cartridge. The term "plunger" as used herein refers to a mechanical component that is used for displacing the printing material that is filled in the cartridge. Optionally, the plunger could be fabricated using a stainless steel, an aluminium metal, a glass, a composite, a polymer, the PTFE, and so forth. Typically, the plunger comprises a body and a spring built into the body. In this regard, the spring expands when the pressure is applied thereon and is returned to its former position by a spring force when the pressure is removed therefrom. The plunger can be linearly pulled and pushed along the inside of the cartridge, thereby allowing the cartridge to take in and expel the printing material. Moreover, the plunger is designed according to the shape of the cartridge. When in operation, the fluid valve allows the pressure to move in only one direction in order to control the movement of the plunger. For example, the fluid valve is operable to allow the pressure such that the plunger remains in the same direction or move forward when the positive pressure is applied or move backward when the negative pressure is applied. It will be appreciated that the plunger does not change the direction because of a back pressure of the printing material.

The term "cartridge adapter" as used herein refers to a mechanical connecting part that is used for connecting two ends of the cartridge. In this regard, the cartridge adapter is coupled or mechanically connected to the first end of the cartridge to enable a mechanical and a fluidic connection between the cartridge adapter and the cartridge. Optionally, the cartridge adapter could be of different configurations such as a screwing mechanism. Optionally, the cartridge adapter is fabricated using a metal (such as an aluminium, a copper, a stainless steel), an alloy, and so forth. Moreover, the cartridge adapter is used to connect the opening of the cartridge that possesses the pressure insulation in case of pressure-based manipulation of the printing material and may also in some cases it could have insulation or conductive properties in which an external force could be used to infuse or extrude the printing material inside the cartridge.

The term "distance sensor" as used herein refers to a device that is used for measuring a distance between two objects. In this regard, the distance sensor is operable to measure a distance (D) between the cartridge adapter and the plunger. Optionally, the distance sensor is selected from at least one of: a time-of-flight sensor, a radar sensor or an optical sensor. The term "time-of-flight sensor" as used herein refers to a sensor that is used for measuring a time taken by an object to travel a distance through a medium. In this regard, the time-of-flight sensor is used for measuring the time taken by the plunger to travel the distance (D) from the cartridge adapter. The term "radar sensor" as used herein refers to a detection sensor that uses radio waves to determine a motion and velocity of an object, by figuring out change in a position, a shape or a trajectory thereof. In this regard, the radar reflections from a transmitter of the radar sensor reflects off the plunger and return to a receiver of the radar sensor, giving information about the location and velocity of the plunger. Optionally, the radar sensor is a millimetre wave (mmWave) radar sensor, such as Texas Instruments IWR 4368AOP chipset, and the like. Beneficially, the mmWave radar arrangements offer greater bandwidth, such as in a range of 3-4 GHz, thereby, providing a more precise image resolution. The term "optical sensor" as used herein refers to a sensing device that possesses an ability to detect light, typically at a specific range of electromagnetic spectra (such as an ultraviolet, a visible, and an infrared). Typically, the optical sensor detects either wavelength, frequency, or polarization of light and converts it into an electric signal due to the photoelectric effect. Moreover, the optical sensor is used to measure the distance (D) between the cartridge adapter and the plunger. Optionally, the distance (D) could be measured by connecting the plunger with a thread or an encoder.

The distance sensor is used to measure the distance only when a speed change of the distance measurement is noticed. Moreover, the distance sensor does not measure the distance when the speed of the distance measurement does not change (constant), thereby saving data transmission. In an ideal situation, when the pressure is constant then the distance (D) increases along with the movement of the plunger from top to bottom in the cartridge. The measured distance is sent to the dispensing system for quality control. Moreover, the distance sensor is used to indicate the amount of pressure exerted by the pressure source. Furthermore, the distance sensor is used to indicate an internal pressure of the cartridge. It will be appreciated that the distance is measured in real-time, thereby allowing the continuous measurement of the distance during the operation.

The term "cartridge outlet" as used herein refers to a connector arrangement associated with the cartridge. The cartridge outlet includes a variety of connections arranged on the second end of the cartridge. The variety of connections may be a locking connection or a slipping connection. Optionally, the cartridge outlet is a luer lock. The luer lock is a standardized arrangement that is used for making leak-free connections between a male-taper fitting and its mating female part. Typically, the luer lock connectors are divided into two types such as a one piece luer lock and a two piece luer lock or a rotating collar luer lock. The one piece luer lock comes as a single mold, and the locking is achieved by rotating the entire luer lock. In the two piece luer lock, a free rotating collar with threads is assembled to the luer and the locking is achieved by rotating the collar. Optionally, the cartridge outlet is a Unified National Fine Thread (UNF) based connection that is controlled by American society of mechanical engineers (ASME) and American national standards institute (ANSI). The cartridge outlet is configured to dispense the printing material. In operation, the pressure source applies the positive pressure such that the fluid valve allows the fluid flow in direction from the pressure source towards the cartridge adapter that is further coupled to the cartridge. The positive pressure enables the plunger to move in a downward direction away from the cartridge adapter such that the distance between the cartridge adapter and the plunger corresponds to the applied positive pressure. Then, the distance sensor is used to measure the distance between the cartridge adapter and the plunger. The displacement of the plunger causes the printing material to be extruded via the cartridge outlet from the system.

The term "processor" as used herein refers to a computational element that is operable to respond to and process instructions. In other words, the processor may refer to one or more individual processors, processing devices and various elements associated with a processing device that may be shared by other processing devices. Such processors, processing devices and elements may be arranged in various architectures for responding to and executing processing steps. It will be appreciated that the processor is operatively coupled to the pressure source, the fluid valve and the distance sensor for supporting efficient functioning thereof. It will be appreciated that optionally the processor includes, but is not limited to, a microprocessor, a microcontroller, a complex instruction set computing (CISC) microprocessor, a reduced instruction set computer (RISC) microprocessor, a very long instruction word (VLIW) microprocessor, or any other type of processing circuit. Furthermore, the term "processor" may refer to one or more individual processors, processing devices and various elements associated with the control unit. Additionally, the one or more individual processors, processing devices and elements are arranged in various architectures for responding to and processing the instructions that drive the system.

The processor is communicably coupled to the pressure source, the fluid valve and the distance sensor via a communication network. It will be appreciated that the communication network may be wired, wireless, or a combination thereof. The communication network could be an individual network or a combination of multiple networks. Examples of the communication network may include, but are not limited to one or more of, Internet, a local network (such as an Ethernet-based local area network, an Ethernet-based personal area network, a Wi-Fi network, and the like), Wide Area Networks (WANs), Metropolitan Area Networks (MANs), a telecommunication network, and a short-range radio network (such as Bluetooth®).

The processor is configured to utilize a predefined set of parameters related to the cartridge to calculate a required distance (D') between the cartridge adapter and the plunger corresponding to a volume of the printing material required to be dispensed. Optionally, the set of parameters is defined or provided in a software file before the step of the utilization of the predefined set of parameters. Then, the processor is configured to calculate the rate of flow of the printing material that is required to be dispensed from the system. In this regard, the rate of flow of the printing material is calculated by relating the volume of the printing material to the distance (D') required between the cartridge adapter and the plunger. Moreover, the processor utilizes the predefined set of parameters related to the cartridge such as the shape of the cartridge, the size of the cartridge, the dimensions of the cartridge, dimensions of the cartridge adapter and dimensions of the cartridge outlet to calculate the required distance (D').

Optionally, the predefined set of parameters comprises at least one of: a density of the printing material, a viscosity of the printing material, a volume of the printing material to be dispensed, dimensions of the cartridge, dimensions of the nozzle connector system. In this regard, the processor utilizes the density of the printing material to calculate the required distance (D'). For example, if the printing material is dense then a speed of the plunger is reduced, thereby causing the processor to increase the speed of the plunger in order to obtain the required distance (D') and dispense the accurate volume of the printing material. Moreover, the processor is operable to calculate the required distance (D') based on the viscosity of the printing material. For example, a less viscous printing material requires a less required distance to dispense the same volume of the printing material in comparison to a more viscous material. Furthermore, the processor is operable to calculate the required distance (D') based on the volume of the printing material to be dispensed. For example, the required distance (D') is directly proportional to the volume of the printing material to be dispensed. Additionally, the dimensions of the cartridge are used to calculate the volume of the printing material that could be dispensed therefrom. The dimensions of the nozzle connector system is used to calculate the rate of flow of the printing material. Mathematically, the rate of flow is expressed by the formula:

$$\Delta Q = \Delta V / \Delta T = \Delta DA / \Delta T$$

Herein, Q refers to the rate of flow of the printing material, V refers to the volume of the printing material, T refers to the time, D refers to the distance between the cartridge adapter and the plunger and A refers to the area of the cartridge or container.

Optionally, the predefined set of parameters includes a type of the printing material. In this regard, the processor may be operable to calculate a rheological characteristic of the printing material based on the type thereof and later store the said rheological characteristic. It will be appreciated that the rheological characteristics are used to determine a behaviour of the flow of the printing material. Optionally, the rheological characteristics are used to make a shear thinning curve and a shear thickening curve for the printing material. Optionally, the shear thinning curve and the shear thickening curve for the printing material are stored in the processor. Optionally, during the operation the distance between the cartridge adapter and the plunger and the corresponding pressure data is measured at a regular intervals of time. Then, the measured data is compared with the shear thinning curve that is already stored in the processor. Now, based on the compared data, the type of the printing material is determined. Modern paints are examples of pseudoplastic materials. In an example, the printing material such as a gelatin-methacryloyl (GelMA) is a shear thinning printing material. The gelatin-methacryloyl is a semi-synthetic hydrogel which consists of gelatin derivatized with methacrylamide and methacrylate groups. In operation, the shear force created by the plunger will cause the shear thinning printing material to be dispensed smoothly and regain the higher viscosity after being dispensed. Optionally, a relation between a shear stress and the viscosity of the printing material is calculated by the processor. Optionally, the processor is employed to utilize the predefined set of parameters in order to calculate a compressibility of the printing material. Typically, the compressibility is a change in the volume of the printing material due to a unit variation of the pressure applied thereon via the plunger into the cartridge. Optionally, the compressibility is measured before dispensation of the printing material. Optionally, the predefined set of parameters is fed into the processor using a manual input.

Optionally, the processor is configured to control the fluid valve to regulate the pressure direction from/to the pressure source. In this regard, the processor is operable to calculate the pressure that is required to be generated based on the predefined set of parameters. For example, the processor determines whether the positive pressure or the negative pressure is required for the dispensation of the printing material. Moreover, in case of extrusion, when the positive pressure is required then the processor is operable to control the fluid valve such that it allows the positive pressure to flow in a forward direction that is from the pressure source towards the plunger. It will be appreciated that the processor enables the fluid valve to efficiently control the direction of the pressure in the system. Thus, preventing the plunger from experiencing the back pressure by the printing material. Furthermore, in case of infusion that is when the negative pressure is required then the processor is operable to control the fluid valve such that it allows the negative pressure to flow in a backward direction that is from outside of the system toward the pressure source. Thus, supporting the accurate infusion of the printing material into the cartridge.

The processor is configured to control the pressure source to regulate a pressure to move the plunger to be at the required distance (D') from the cartridge adapter at a defined speed to control the rate of flow of the printing material. In this regard, the processor utilizes the predefined set of parameters for controlling the pressure source. In an example, when the pressure starts to get increase then the processor commands the pressure source to add the air pressure. The added air pressure is used to keep the speed of the plunger constant, thereby maintaining the distance on a linear scale. The air pressure is added as long as the distance is back to linear scale and the pressure measured with the pressure sensor is stabilized back to normal initial pressure level. Optionally, the processor is used to monitor the amount of the printing material that is being dispensed at the corresponding pressure. The processor is used to calculate the required distance (D') by using the monitored data and correlate the monitored data with the predefined set of parameters.

Optionally, the system further comprising at least one regulator having at least one first end and at least one second end, configured to regulate the pressure in the cartridge, wherein the first end is fluidically coupled to the pressure source. The term "regulator" refers to a device that, in operation, controls the pressure at its ends, as required. Since a given pressure generated by the pressure source may be different from a required pressure for dispensing the printing material, the at least one regulator is required to control the pressure at its ends to provide the required pressure. In particular, the at least one regulator is used to control the pressure source to regulate the pressure. The regulated pressure is used to move or displace the plunger to be at the required distance (D') from the cartridge adapter at a defined speed to control the rate of flow of the printing material. Herein, the at least one regulator is fluidically coupled to the pressure source. Notably, the at least one regulator has a body comprising the at least one first end and the at least one second end. The at least one first end is fluidically coupled to the pressure source. Optionally, the at least one first end is fluidically coupled to the pressure source using a valve. Optionally, a type of the at least one regulator depends upon a magnitude of the pressure generated by the pressure source. Optionally, the at least one regulator could be selected from at least one of: a high-pressure regulator, a low-pressure regulator, a back pressure regulator, a vacuum pressure regulator, a differential pressure regulator.

Optionally, the processor is further configured to control the at least one regulator to regulate the pressure such that the monitored current rate of flow matches the desired rate of flow for dispensing of the printing material. In this regard, the processor is communicably coupled to the at least one regulator for receiving the monitored data regarding the current rate of flow and then regulating the pressure such that the monitored current rate of flow is equal to the desired rate of flow for dispensing of the printing material. Herein, the processor controls the at least one regulator to regulate the pressure received at the at least one first end. Optionally, the at least one regulator is manually controlled. For example, the at least one regulator may have at least one knob. At least one knob could be rotated to control the pressure received at the at least one first end.

Optionally, the system further comprises a pressure sensor, wherein the pressure sensor is arranged in the cartridge adapter and is configured to measure pressure inside the cartridge. The term "pressure sensor" as used herein refers to a sensing device that is used to sense pressure and converts it into an electric signal. The pressure sensor is arranged in the cartridge adapter to measure the pressure in the cartridge accurately. Optionally, the pressure sensor could measure the pressure in a range from 0.001 mBar to 100 Bars. Additionally, the pressure sensor is used to monitor the pressure in the cartridge and the fluid valve. It will be appreciated that the distance sensor and the pressure sensor work in conjunction with each other in order to keep the speed of the plunger constant in the system. Optionally, the pressure sensor is communicably coupled to the processor, thereby allowing the processor to receive the pressure data that is measured using the pressure sensor. The pressure data may then be used by the processor to maintain the optimum pressure in the system.

Optionally, the system further comprising one or more flow valves operatively coupled to the cartridge outlet and/or to a nozzle connector system to control flow path of the dispensing of the printing material from the nozzle connector system. The term "flow valve" as used herein refers to a device that is used to control or regulate the flow or pressure of the fluid. The term "nozzle connector system" as used herein refers to a mechanical device or an orifice that is designed to control the characteristics of the fluid flow as it exits (or enters) the cartridge outlet. In this regard, the system may employ one or more flow valves to efficiently control the fluid flow path of the dispensing of the printing material from the nozzle connector system. Moreover, the one or more flow valves is used to respond to signals generated by independent components such as the cartridge outlet and/or the nozzle connector system. Optionally, the one or more flow valve is a solenoid valve. The solenoid valve is an electromechanically operated valve that is coupled with the nozzle connector system for allowing a two-step regulation of the printing material by closing or opening the solenoid valve in the nozzle connector system. Furthermore, the solenoid valve is used for creating a vacuum for controlling the printing material during extrusion and to get the optimum pressure for the dispensation of the printing material. In this regard, the solenoid valve is opened when the extrusion begins and is closed when the extrusion is finished. Optionally, the solenoid valve could use a two-port design to regulate the flow of the printing material or use a three or more port design to switch flows between the ports. It will be appreciated that the one or more fluid valves, the cartridge outlet and the nozzle connector system work in conjunction with each other to save the printing material. Optionally, a flow detection sensor is used to monitor the printing material output for a given pressure. Optionally, the one or more valve is a piezo valve. The piezo valve is an electromechanical transducer that converts mechanical forces such as the pressure into a measurable voltage. In this regard, the piezo valve is used for closing and opening the flow path. Beneficially, the one or more flow valves provides fast and safe switching, high-reliability, long service life, low power consumption and compact design.

Optionally, the system further comprising a printing material sensor including at least one of: an optical sensor, a camera, a scale, wherein the printing material sensor is configured to at least:

monitor a rate of flow of the dispensing of the printing material; and send the monitored rate of flow to the processor if the current rate of flow for dispensing of the printing material differs from the desired rate of flow or from the measured rate of flow for dispensing of the printing material.

The term "printing material sensor" as used herein refers to a sensing device that is used to monitor the printing material. In this regard, the printing material sensor is operatively coupled to the processor for sending a monitored data to the processor. It will be appreciated that the printing material sensor and the processor works in conjunction with each other to form a feedback loop. Beneficially, the feedback is used to characterize the rheology of the printing material that is at what pressure the printing material is being extruded. Advantageously, the processor monitors the current rate of flow and compares thereof with the desired rate of flow to achieve an optimum rate of flow of the printing material. For example, the printing material sensor monitors the printing material that is being dispensed from the cartridge outlet and send the monitored data to the processor. The processor then correlates or compare the monitored data with the predefined set of parameters, thereby supporting an efficient controlling of the rate of flow of the printing material.

The term "optical sensor" as used herein refers to a sensing device that is used to convert light rays into electronic signals. Typically, the optical sensor is used to detect and quantify various properties of light such as intensity, frequency, wavelength, and polarization. In this regard, the optical sensor is operable to monitor the dispensation of the printing material by detecting whether the printing material is dispensing out or not from the cartridge outlet. Moreover, the optical sensor is operable to send the monitored data to the processor as the feedback. In an example, when the optical sensor detects that the printing material is not dispensing from the system then the optical sensor is operable to send such monitored data to the processor. The processor is operable to receive the monitored data from the optical sensor and then control the pressure source to achieve an optimum rate of flow of the printing material.

The term "camera" as used herein refers to an optical instrument that is used to capture an image of a subject. Optionally, the camera may capture a video of the subject. The image refers to visual representation of the printing material captured by the camera. In this regard, the camera is configured to monitor the rate of flow of the printing material by monitoring whether the printing material is dispensing or not. Optionally, the camera is used to monitor if the rate of flow of the dispensation of the printing material is constant. In an example, when the camera monitors that the dispensing of the printing material is stopped then it sends the monitored data to the processor. The processor then controls the pressure based on the monitored data to keep the speed of the plunger constant. It will be appreciated that the camera is used for a quality control of the printing material that is to be dispensed from the system.

The term "scale" as used herein refers to a device for measuring a weight or a mass. It will be appreciated that the scale may measure the weight rather than the mass, but in a given gravitational field (such as the Earth's gravity), the weight of an object is proportional to the mass thereof. Typically, the scale reads in units of mass, such as kilograms, grams, milligrams, and so on. Optionally, some scales could be calibrated to read in units of force, such as newtons. In this regard, the scale measures the force needed to counter the mass being measured. Optionally, the scale may be implemented as an electronic analytical scale having a flat pan-like structure.

Optionally, the scale such as a weighing scale may be arranged below a printing surface for measuring different weights during the operation. Moreover, the scale is used to measure the weight of the printing material that is being extruded from the system in order to make sure that a correct amount of the printing material is being extruded from the system. Furthermore, the scale is operable to measure the weight of the printing material at regular intervals of time. In an example, the processor utilizes the measured weight of the printing material to calculate the density and the speed of the printing material to measure the rate of flow. Advantageously, the measured weight of the printing material is sent to the processor for calculating the rate of flow of the printing material. Optionally, the scale may be integrated with the printing surface. Beneficially, arranging the scale below the printing surface (or as a part of the printing surface) enables real-time process and quality control before, during and/or after the dispensation of the printing material.

The present disclosure also relates to the method as described above. Various embodiments and variants disclosed above, with respect to the aforementioned first aspect, apply mutatis mutandis to the method.

Optionally, the method further comprising regulating pressure in the cartridge using at least one regulator, the at least one regulator having at least one first end and at least one second end, wherein the first end is fluidically coupled to the pressure source.

Optionally, the method further comprising measuring a pressure inside the cartridge using a pressure sensor arranged in the cartridge adapter.

Optionally the pressure sensor may be arranged at the nozzle end before or after the flow valve and also both in the cartridge adapter as well as the cartridge output for precise pressure readings and to get precise readings.

Optionally, the method further comprising controlling a flow path of the dispensing of the printing material using one or more flow valves, wherein the one or more fluid control valves is operatively coupled to the cartridge outlet and/or to a nozzle connector system.

Optionally, the method further comprising using a printing material sensor including at least one of an optical sensor, a camera and a scale, wherein the printing material sensor is configured to:

monitor a current rate of flow of the dispensing of the printing material; and send the monitored current rate of flow to the processor if the current rate of flow for dispensing of the printing material differs from the desired rate of flow for dispensing of the printing material.

Optionally, the method further comprising using the processor to control the at least one regulator, and wherein the at least one regulator is configured to regulate the pressure from the pressure source such that the monitored current rate of flow matches the desired rate of flow and the measured rate of flow for dispensing of the printing material.

Optionally, the method further comprising:

measuring, using the distance sensor, the distance between the cartridge adapter and the plunger;

measuring the pressure in the cartridge, wherein the pressure is based on a viscosity of the printing material; and controlling a position of the plunger based on the measured distance and the measured pressure.

It will be appreciated that the method supports the distance sensor, the pressure sensor and the plunger to work in conjunction with each other in order to efficiently control the rate of flow of the printing material.

Optionally, the measured distance (D) and the required distance (D') are compared for determining a difference between the measured distance (D) and the required distance (D'), and if the difference is above a predetermined level then a signal is generated.

The term "signal" as used herein refers to a function that is used for conveying an information about a phenomenon. In this regard, the processor is operatively coupled to the distance sensor for determining the difference between the measured distance (D) and the required distance (D'). Moreover, the method supports generation of the signal when the difference is above a predetermined level. In an example, the method enables generation of the signal in the form of an alarm to stop the extrusion or to correct the predefined set of parameters. Optionally, the signal is a start or a stop signal that indicates the beginning or the completion of the dispensation of the printing material. Optionally, the signal is an analog signal depicting the distance (micrometres) and the pressure (micro bars to bars). Optionally, the range of the pressure is from 0.1 milli bars to 100000 millibars.

Optionally, the generated signal is used to keep the speed of the plunger constant. In this regard, the method enables the processor to utilize the determined difference between the measured distance (D) and the required distance (D') for generating the signal. It will be appreciated that the generated signal is then used for controlling the speed of the plunger. Optionally, the range of the speed of the plunger is from 1 micrometre per millisecond to 1 centimetre per second in the cartridge. Moreover, the generated signal is used to study the rheological behaviour of the printing material. Optionally, the generated signal is used to observe the reproducibility of the extrusion of the printing material.

Optionally, the method further comprising:

measuring in real time, using the distance sensor, the distance between the cartridge adapter and the plunger;

measuring in real time the pressure in the cartridge, wherein the pressure is based on a viscosity of the printing material; and controlling a position of the plunger based on the measured distance and the measured pressure.

Optionally, the method further comprising using the processor to control the fluid valve to regulate a pressure direction from/to the pressure source, wherein the processor is operatively coupled to the pressure source.

The present disclosure also relates to the computer-program product as described above, wherein the material to be printed is a biomaterial, a biological material, a pharmacological material or a combination of the aforementioned materials, the computer program product comprising a non-transitory machine-readable data storage medium having stored thereon program instructions that, when accessed by a processor, cause the processor to execute steps of a method of any of the aforementioned claims. Optionally, the material to be printed may be therapeutic material, advanced material having various behaviours with various stimulus such as electromagnetic waves, humidity, heat, pressure, force or a combination of the aforementioned materials and stimulus. Various embodiments and variants disclosed above, with respect to the aforementioned aspects, apply mutatis mutandis to the computer-program product.

Optionally, the computer program product is implemented as an algorithm, embedded in a software stored in the non-transitory machine-readable data storage medium. The non-transitory machine-readable data storage medium may include, but is not limited to, an electronic storage device, a magnetic storage device, an optical storage device, an electromagnetic storage device, a semiconductor storage device, or any suitable combination of the foregoing. Examples of implementation of the computer-readable medium include, but are not limited to, Electrically Erasable Programmable Read-Only Memory (EEPROM), Random Access Memory (R.A.M), Read Only Memory (ROM), Hard Disk Drive (HDD), Flash memory, a Secure Digital (SD) card, Solid-State Drive (SSD), a computer readable storage medium, and/or CPU cache memory.

Furthermore, the present disclosure relates to dosing, filling, multidimensional printing, medicine printing, bio printing, pharma printing, food printing, subtractive manufacturing, casting process, and the like, which have been used for the producing of various products or material. Optionally the method and system of the present disclosure can be utilised in space or in other non-gravity or in a vacuum or in a stimulated environment, for example with multiple electromagnetic radiations) on the ground or underground.

Optionally, the system, the method and the computer program in the present disclosure may be used in a stand-alone unit as a smart injector inside animals and humans and other organisms for drawing tissues, biological substances, solvents in a predefined manner. Optionally, the system, method and the computer program in the present disclosure may be used as a programmable dosing instrument to dispense materials for various industries.

DETAILED DESCRIPTION OF DRAWINGS

Referring to FIG. 1, there is shown a schematic illustration of a system 100 for controlling rate of flow of a printing material (not shown) in a dispensing system (not shown), in accordance with an embodiment of the present disclosure. As shown, the system 100 comprises a pressure source 102 configured to provide pressure for dispensing of the printing material. Moreover, the system 100 comprises a cartridge 104 having a first end 104A and a second end 104B. The cartridge 104 is operatively coupled to the pressure source 102 and is configured to hold the printing material therein. The cartridge 104 comprises a plunger 106 for displacing the printing material from the cartridge 104. Additionally, the system 100 comprises a cartridge adapter 108 coupled to the first end 104A of the cartridge 104. Furthermore, the system 100 comprises a distance sensor 110 operable to measure a distance (D) between the cartridge adapter 108 and the plunger 106. Furthermore, the system 100 comprises a cartridge outlet 112 having variety of connections arranged on the second end 104B of the cartridge 104 and configured to dispense the printing material.

The system 100 comprises a processor 114 operatively coupled to the pressure source 102 and the distance sensor 110. The processor 114 is configured to utilize a predefined set of parameters related to the cartridge 104 to calculate a required distance (D') between the cartridge adapter 108 and the plunger 106 corresponding to a volume of the printing material required to be dispensed. Furthermore, the processor 114 is configured to control the pressure source 102 to regulate a pressure to move the plunger 106 to be at the required distance (D') from the cartridge adapter 108 at a defined speed to control the rate of flow of the printing material. Moreover, the system 100 further comprises a fluid valve 116 coupled to the pressure source 102 and allowing fluid flow in direction from/to the pressure source 102 as per the configuration.

The system 100 further comprises at least one regulator 118 having at least one first end 118A and at least one second end 118B, configured to regulate the pressure in the cartridge 104, wherein the first end 118A is fluidically coupled to the pressure source 102.

The system 100 further comprises a pressure sensor 120, wherein the pressure sensor is arranged in the cartridge adapter 108 and is configured to measure pressure inside the cartridge 104.

The system 100 further comprises one or more flow valves 122 operatively coupled to the cartridge outlet 112 and/or to a nozzle connector system 124 to control flow path of the dispensing of the printing material from the nozzle connector system 124. The system 100 further comprises a printing material sensor 126 for monitoring a rate of flow of the dispensing of the printing material and sending the monitored rate of flow to the processor 114 if the current rate of flow for dispensing of the printing material differs from the desired rate of flow or from the measured rate of flow for dispensing of the printing material.

Figure 2:
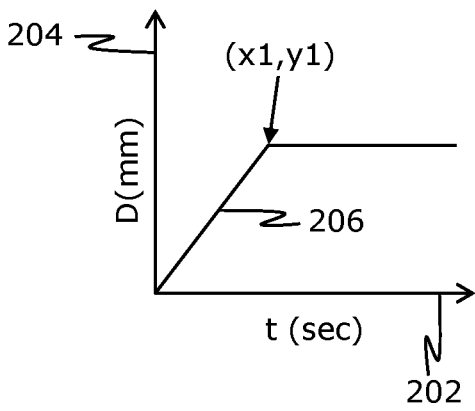
FIG. 2 is a graphical representation illustrating an amount of a printing material stored in a cartridge, in accordance with an embodiment of the present disclosure.

Referring to FIG. 2, there is shown a graphical representation 200 illustrating an amount of a printing material stored in a cartridge, in accordance with an embodiment of the present disclosure. Herein, an x-axis 202 denotes time taken by a plunger to extrude the printing material and a y-axis 204 denotes the distance (D) between a cartridge adapter and the plunger. As shown, the amount of the printing material stored in the cartridge is decreasing with the increase in the distance (D) and the time. As shown, a straight line (206) depicts that the plunger is moving linearly. Moreover, a first coordinate point (x1, y1) denotes that either the cartridge is empty or a pressure exerted by a pressure source is not enough to extrude the printing material from the cartridge.

Figure 3:
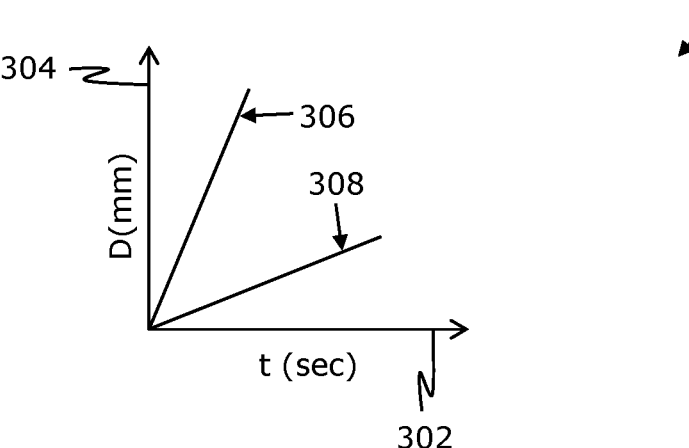
FIG. 3 is a graphical representation illustrating a viscosity of a printing material that is being dispensed from a system, in accordance with an embodiment of the present disclosure.

Referring to FIG. 3, there is shown a graphical representation 300 illustrating a viscosity of a printing material that is being dispensed from a system, in accordance with an embodiment of the present disclosure. Herein, an x-axis 302 denotes time taken by a plunger for dispensing the printing material and a y-axis 304 denotes a distance (D) between a cartridge adapter and the plunger present in the system, when a corresponding pressure is applied on the plunger. In a first case, a slope 306 depicts that the plunger covers a large distance within a short period of time, thereby indicating that the printing material that is being dispensed from the system possesses a low viscosity. In a second case, a slope 308 depicts that the plunger covers a short distance in a long period of time, thereby indicating that the printing material possesses a high viscosity.

Figure 4:
FIG. 4 is a graphical representation illustrating a rheological behaviour of a printing material that is being dispensed from a system, in accordance with an embodiment of the present disclosure.
Figure 4:
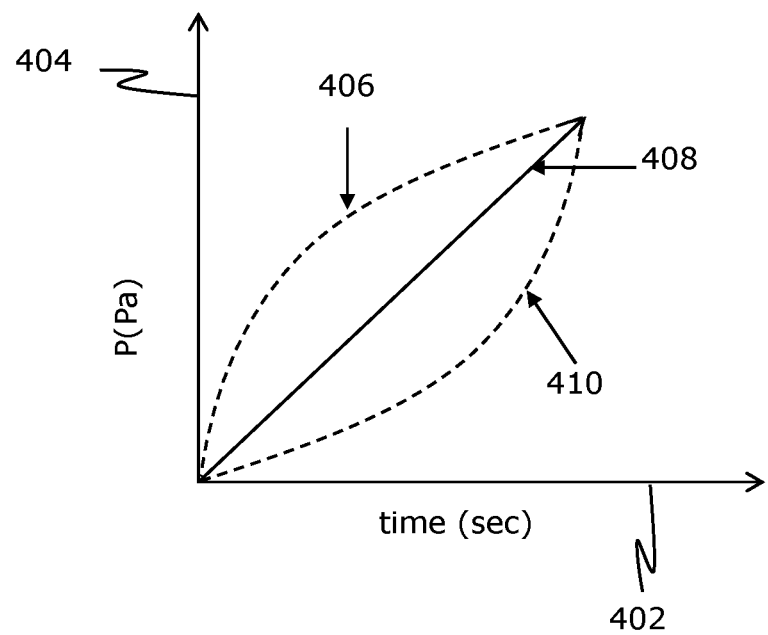

Referring to FIG. 4, there is shown a graphical representation 400 illustrating a rheological behaviour of a printing material that is being dispensed from a system, in accordance with an embodiment of the present disclosure. Herein, an x-axis 402 denotes time taken by the printing material for dispensation thereof from the system and y-axis 404 denotes a pressure applied on the printing material, using a pressure source, for dispensation thereof from the system. As shown, a curve 406 depicts that the printing material is a shear thinning or a pseudoplastic printing material. The slope 408 depicts that the printing material is a Newtonian fluid having a constant viscosity. Furthermore, a curve 410 depicts that the printing material is a non-Newtonian, shear thickening or a dilatant printing material.

Figure 5A:
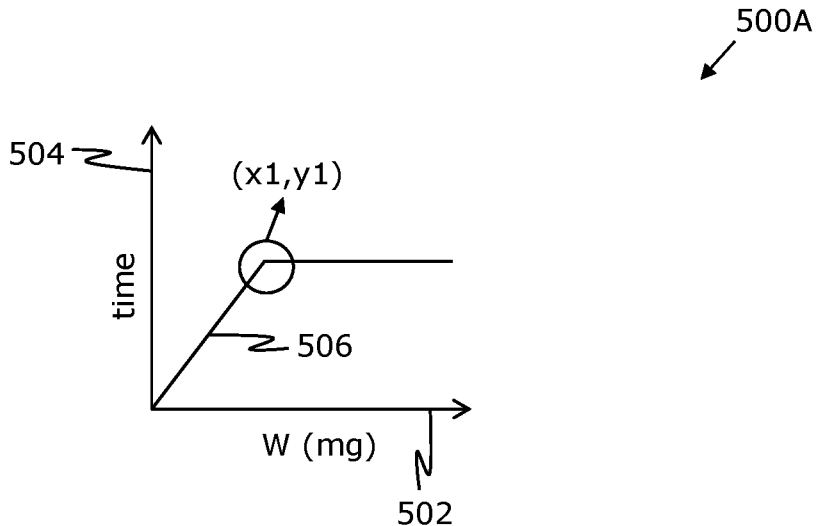
FIGS. 5A, 5B, 5C and 5D are graphical representations depicting multimodality of a predefined set of parameters, in accordance with an embodiment of the present disclosure.

Referring to FIGS. 5A, 5B, 5C and 5D, there are shown graphical representations 500A, 500B, 500C and 500D depicting multimodality of a predefined set of parameters, in accordance with an embodiment of the present disclosure. FIG. 5A illustrates an x-axis 502 that denotes a weight of a printing material being dispensed from a system and a y-axis 504 that denotes a time taken by the printing material for dispensation thereof. As shown, a slope 506 indicates a rate of change of the weight of the printing material with respect to time, when the printing material is measured on a scale. Herein, the weight of the printing material is increasing with an increase in time during the extrusion thereof. Moreover, a coordinate point (x1, y1) depicts that a cartridge of the system has dispensed the whole printing material present therein, thereby indicating that the extrusion is stopped.

Figure 5B:
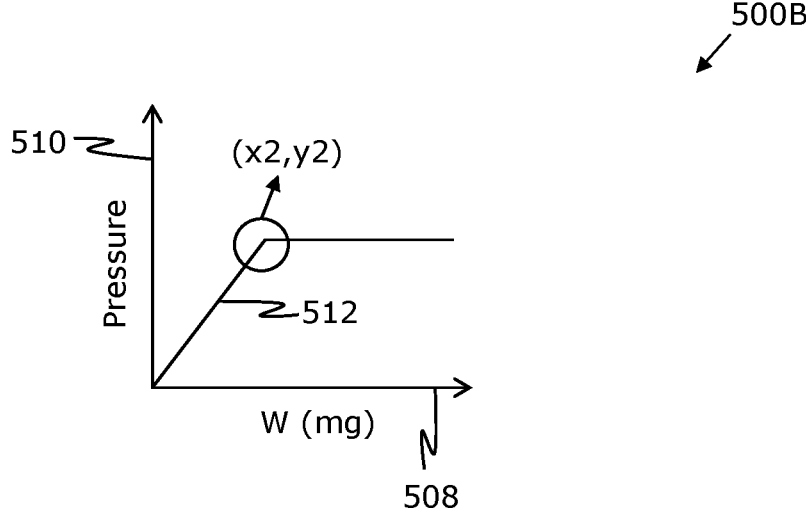

FIG. 5B illustrates an x-axis 508 that denotes a weight of the printing material being dispensed from a system and a y-axis 510 that denotes a pressure applied on the printing material for dispensation thereof. Herein, a slope 512 indicates a rate of change of the pressure with respect to the weight of the printing material. Moreover, a coordinate point (x2, y2) is depicting that the cartridge has dispensed the whole printing material present therein.

Figure 5C:
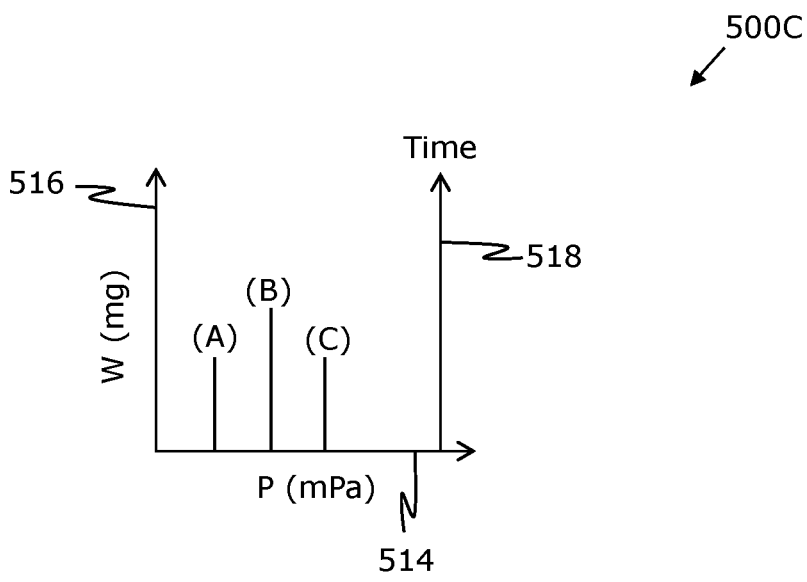

FIG. 5C illustrates an x-axis 514 that denotes a pressure applied on the printing material and y-axis 516 and 518 that denotes a weight of the printing material and the time taken for the dispensation thereof. Herein, lines (A, B and C) are depicting three different printing materials. As shown, the lines (A, B and C) is depicting how a weight of the printing material that is being dispensed from the system is changing with respect to time and when a corresponding pressure is applied thereon.

Figure 5D:
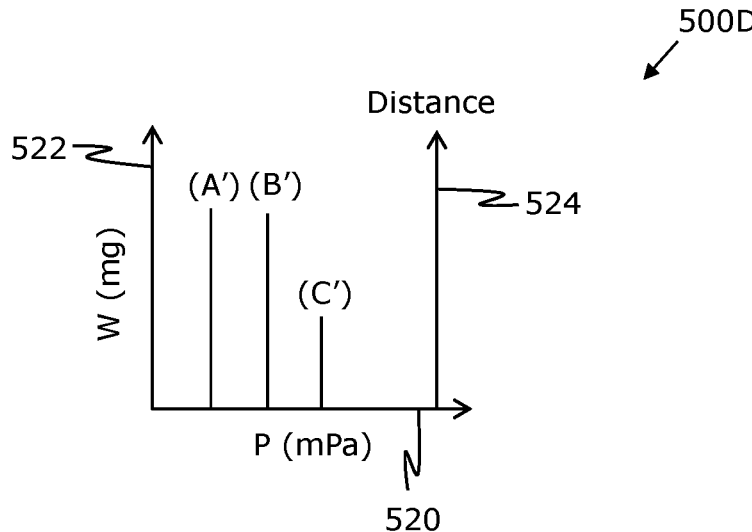

FIG. 5D illustrates an x-axis 520 that denotes a pressure applied on the printing material and y-axis 522 and 524 that denotes a weight of the printing material and a distance (D) for the dispensation thereof. Herein, lines (A', B' and C') are depicting three different printing materials. As shown, the lines (A', B' and C') is depicting how a weight of the printing material that is being dispensed from the system is changing with respect to the distance (D) and when a corresponding pressure is applied thereon. It will be appreciated that such multimodality graphical representations enable a processor to receive a feedback therefrom for efficient controlling of a rate of flow by the system.

Figure 6A:
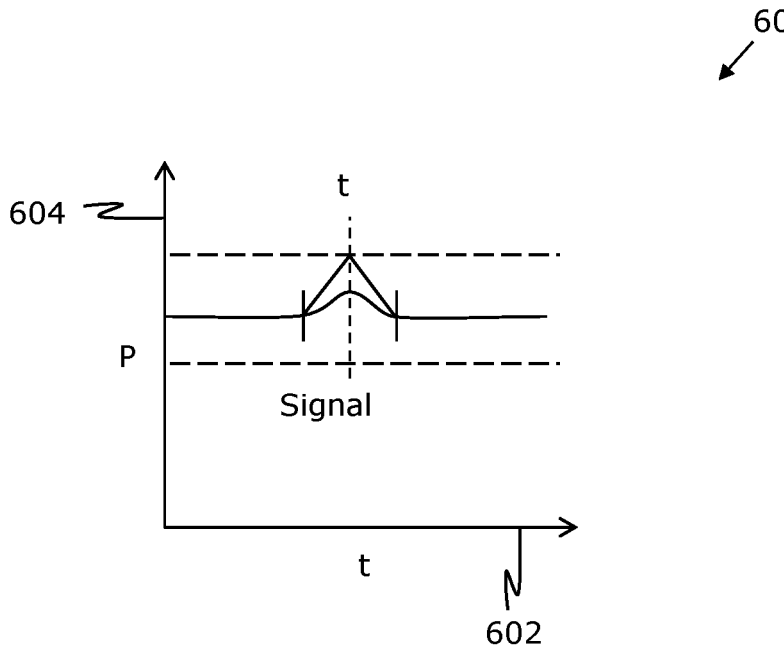
FIGS. 6A and 6B, there are shown graphical representations depicting a generation of a signal, in accordance with an embodiment of the present disclosure.
Figure 6B:
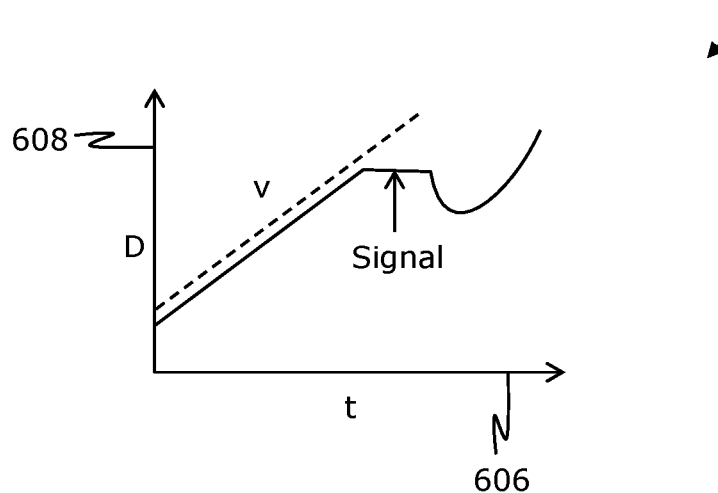

Referring to FIGS. 6A and 6B, there are shown graphical representations 600A and 600B depicting a generation of a signal, in accordance with an embodiment of the present disclosure. FIG. 6A illustrates an x-axis 602 that denotes a time and a y-axis 604 that denotes a corresponding pressure required by a printing material for dispensation thereof. As shown, the system generates the signal when a measured pressure differs from the predefined pressure. FIG. 6B illustrates an x-axis 606 that denotes a time and a y-axis 608 that denotes a corresponding distance required by a printing material for dispensation thereof. As shown, the system generates the signal when the measured distance (D) and the required distance (D') are compared for determining a difference between the measured distance (D) and the required distance (D'), and if the difference is above a predetermined level.

Figure 7:
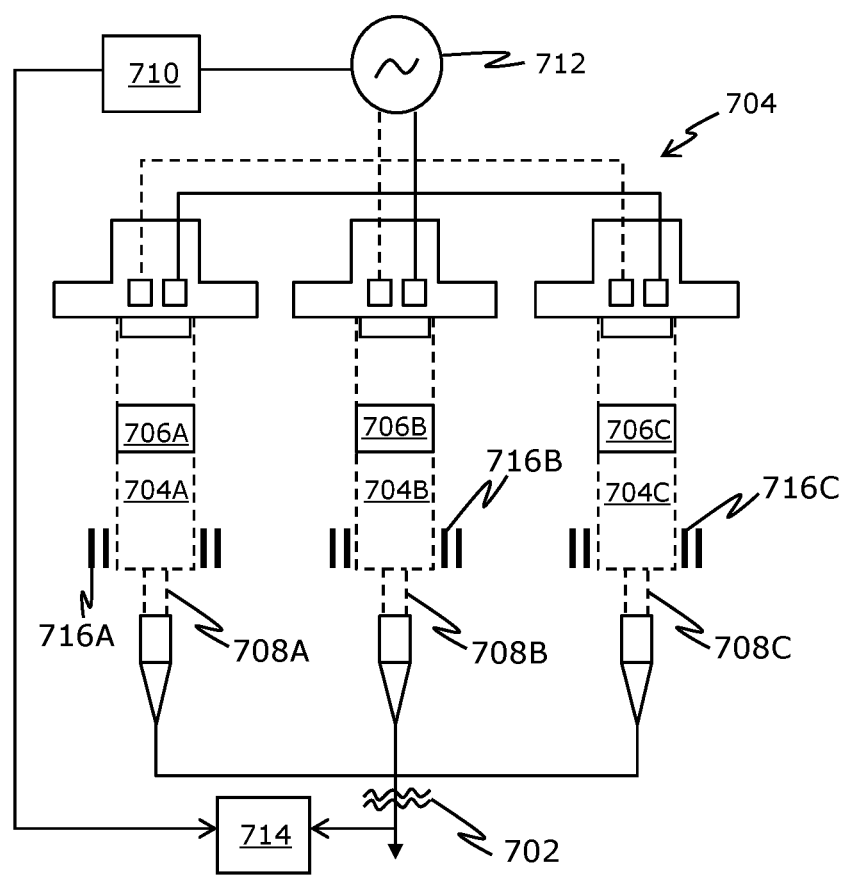
FIG. 7 is an exemplary implementation of a system for controlling a rate of flow of a printing material having a multiple cartridge assembly, in accordance with an embodiment of the present disclosure.

Referring to FIG. 7, there is shown an exemplary implementation of a system 700 for controlling rate of flow of a printing material 702 having a multiple cartridge assembly 704, in accordance with an embodiment of the present disclosure. As shown, the multiple cartridge assembly 704 comprises a plurality of cartridges such as 704A, 704B and 704C arranged in parallel to each other. Each of the plurality of cartridges such as 704A, 704B and 704C is configured to hold the printing material 702 therein. Moreover, each of the plurality of cartridges such as 704A, 704B and 704C comprises a plunger 706A, 706B and 706C for displacing the printing material 702 from the plurality of cartridges such as 704A, 704B and 704C. Each of the plurality of cartridges such as 704A, 704B and 704C comprises a cartridge outlet 708A, 708B and 708C. As shown, the processor 710 is operatively coupled to a pressure source 712 and is configured for controlling a rate of flow of the printing material 702 dispensed by each of the plurality of cartridges such as 704A, 704B and 704C. The system 700 further comprises a printing material sensor 714 for monitoring the rate of flow of the dispensing of the printing material 702 and sending the monitored rate of flow to the processor 710. Moreover, the system 700 comprises a plurality of heating/cooling units such as 716A, 716B and 716C arranged beside each of the plurality of cartridges such as 704A, 704B and 704C for heating/cooling thereof.

Figure 8:
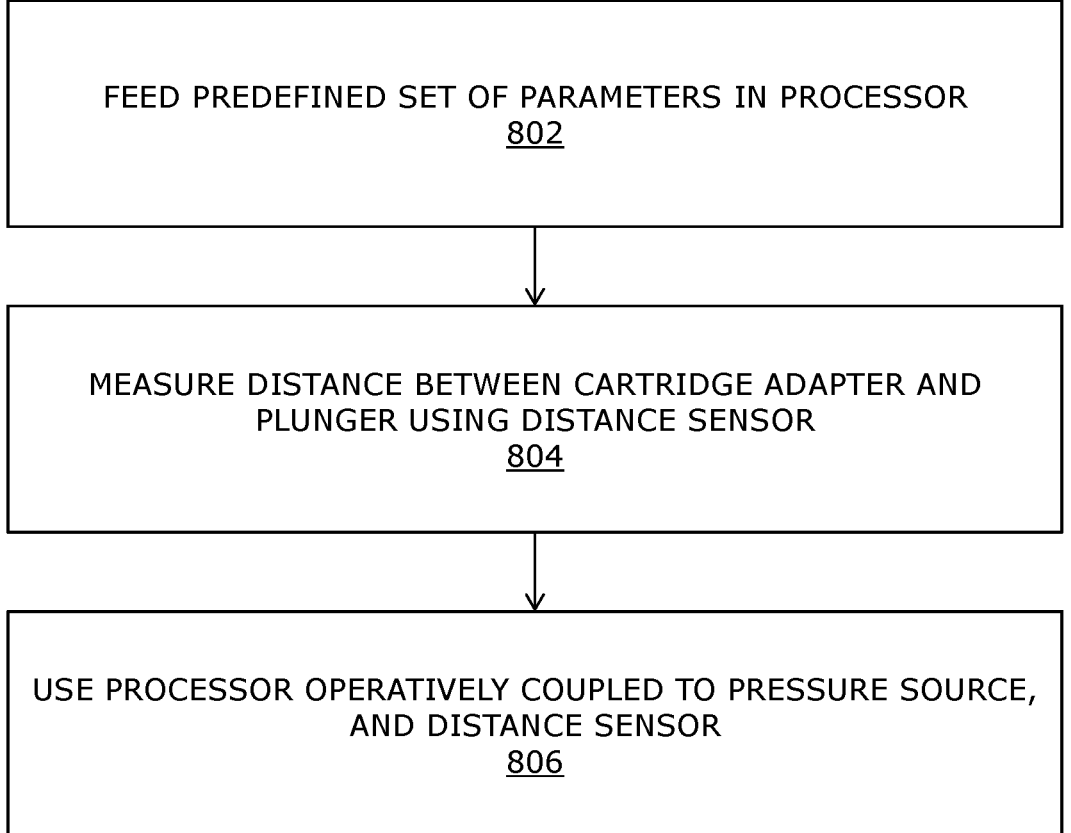
FIG. 8 is a flow chart depicting steps of a method for controlling a rate of flow of a printing material in a dispensing system, in accordance with an embodiment of the present disclosure.

Referring to FIG. 8, there is shown a flow chart depicting steps of a method for controlling a rate of flow of a printing material in a dispensing system, in accordance with an embodiment of the present disclosure. At step 802, a predefined set of parameters is fed in a processor. At step 804, a distance (D) between a cartridge adapter and a plunger is measured using a distance sensor, wherein the distance sensor is arranged on the cartridge adapter that is sealingly coupled to a first end of a cartridge. At step 806, the processor is used. The processor is operatively coupled to a pressure source and the distance sensor, wherein the processor is configured to utilize the measured distance (D), and/or the predefined set of parameters to calculate a required distance (D') between the cartridge adapter and the plunger corresponding to the volume of the printing material required to be dispensed and control the pressure source to regulate amount of pressure to move the plunger to be at the required distance from the cartridge adapter at a defined speed, to control the rate of flow of the printing material.

The aforementioned steps are only illustrative, and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for controlling rate of flow of a printing material in a dispensing system, the system comprising:
   a pressure source configured to provide pressure for dispensing of the printing material;
   a cartridge having a first end and a second end, the cartridge operatively coupled to the pressure source and configured to hold the printing material therein, wherein the cartridge comprises a plunger for displacing the printing material from the cartridge;
   a cartridge adapter coupled to the first end of the cartridge;
   a distance sensor configured to measure a distance (D) between the cartridge adapter and the plunger;

a cartridge outlet configured to dispense the printing material;

a processor operatively coupled to the pressure source, and the distance sensor, wherein the processor is configured to:

utilize the measured distance (D) and/or a predefined set of parameters related to the cartridge to calculate a required distance between the cartridge adapter and the plunger corresponding to a volume of the printing material required to be dispensed; and control the pressure source to regulate a pressure to move the plunger to be at the required distance from the cartridge adapter at a defined speed to control the rate of flow of the printing material; and a printing material sensor including at least one of: an optical sensor, a camera, and a scale, wherein the printing material sensor is configured to at least:

monitor a rate of flow of the dispensing of the printed material; and send the monitored rate of flow to the processor if a current rate of flow for dispensing of the printing material differs from a desired rate of flow or from a measured rate of flow for dispensing of the printing material.

2. The system according to claim 1, further comprising at least one regulator having at least one first end and at least one second end, configured to regulate the pressure in the cartridge, wherein the first end is fluidically coupled to the pressure source.

3. The system according to claim 1, further comprising a pressure sensor, wherein the pressure sensor is arranged in the cartridge adapter and is configured to measure pressure inside the cartridge.

4. The system according to claim 1, further comprising one or more flow valves operatively coupled to the cartridge outlet and/or to a nozzle connector system to control flow path of the dispensing of the printing material from the nozzle connector system.

5. The system according to claim 1, wherein the distance sensor is selected from at least one of: a time-of-flight sensor, a radar sensor or an optical sensor.

6. The system according to claim 1, wherein the predefined set of parameters comprises at least one of: a density of the printing material, a viscosity of the printing material, a volume of the printing material to be dispensed, dimensions of the cartridge, dimensions of the nozzle connector system.

7. The system according to claim 2, wherein the processor is further configured to control the at least one regulator to regulate the pressure such that the monitored current rate of flow matches the desired rate of flow for dispensing of the printing material.

8. The system according to claim 1, wherein the printing material is a biomaterial, a biological material, a pharmacological material or a combination of the aforementioned.

9. The system according to claim 1, further comprising a fluid valve coupled to the pressure source, the cartridge and the processor, wherein the fluid valve is configured for allowing fluid flow in direction from/to the pressure source as per the configuration.

*   *   *   *   *